United States Patent
Maher et al.

(10) Patent No.: US 10,491,417 B2
(45) Date of Patent: *Nov. 26, 2019

(54) MULTI-NETWORKED LIGHTING DEVICE

(71) Applicant: ABL IP HOLDING LLC, Conyers, GA (US)

(72) Inventors: Hampton Maher, Washington, DC (US); Jack C. Rains, Jr., Sarasota, FL (US); David P. Ramer, Reston, VA (US)

(73) Assignee: ABL IP HOLDLING LLC, Conyers, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/000,359

(22) Filed: Jun. 5, 2018

(65) Prior Publication Data

US 2018/0287811 A1    Oct. 4, 2018

Related U.S. Application Data

(63) Continuation of application No. 15/653,812, filed on Jul. 19, 2017, now Pat. No. 10,020,955, which is a continuation of application No. 14/708,684, filed on May 11, 2015, now Pat. No. 9,735,977.

(51) Int. Cl.
*H04L 12/28* (2006.01)
*H05B 37/02* (2006.01)

(52) U.S. Cl.
CPC ........ *H04L 12/282* (2013.01); *H04L 12/2825* (2013.01); *H04L 12/2827* (2013.01); *H04L 12/2832* (2013.01); *H04L 12/2834* (2013.01); *H05B 37/0245* (2013.01)

(58) Field of Classification Search
None
See application file for complete search history.

(56) References Cited

U.S. PATENT DOCUMENTS

| | | | |
|---|---|---|---|
| 5,877,490 A | 3/1999 | Ramer et al. | |
| 5,914,487 A | 6/1999 | Ramer et al. | |
| 9,735,977 B2 * | 8/2017 | Maher | H04L 12/282 |
| 10,020,955 B2 * | 7/2018 | Maher | H04L 12/282 |
| 2013/0249442 A1 | 9/2013 | Piper | |
| 2013/0293877 A1 | 11/2013 | Ramer et al. | |
| 2013/0297212 A1 | 11/2013 | Ramer et al. | |
| 2015/0043425 A1 | 2/2015 | Aggarwal et al. | |

OTHER PUBLICATIONS

Entire prosecution history of U.S. Appl. No. 14/708,684, filed May 11, 2015, entitled "Multi-Networked Lighting Device."
Entire prosecution history of U.S. Appl. No. 15/653,812, filed Jul. 19, 2017, entitled "Multi-Networked Lighting Device."

* cited by examiner

*Primary Examiner* — Daniell L Negron
(74) *Attorney, Agent, or Firm* — RatnerPrestia

(57) ABSTRACT

A lighting device utilizes physical or virtual separation of elements within the lighting device to isolate a first portion of data for delivery to a first data network from a second portion of data for delivery to a second data network. The first portion of data relates to a first signal generated responsive to a first sensed condition. The second portion of data may relate to the first signal or to a second signal generated responsive to the first sensed condition or a second sensed condition. The lighting device utilizes a first communication interface to deliver the first portion of data to the first data network and a second communication interface to deliver the second portion of data to the second data network.

20 Claims, 8 Drawing Sheets

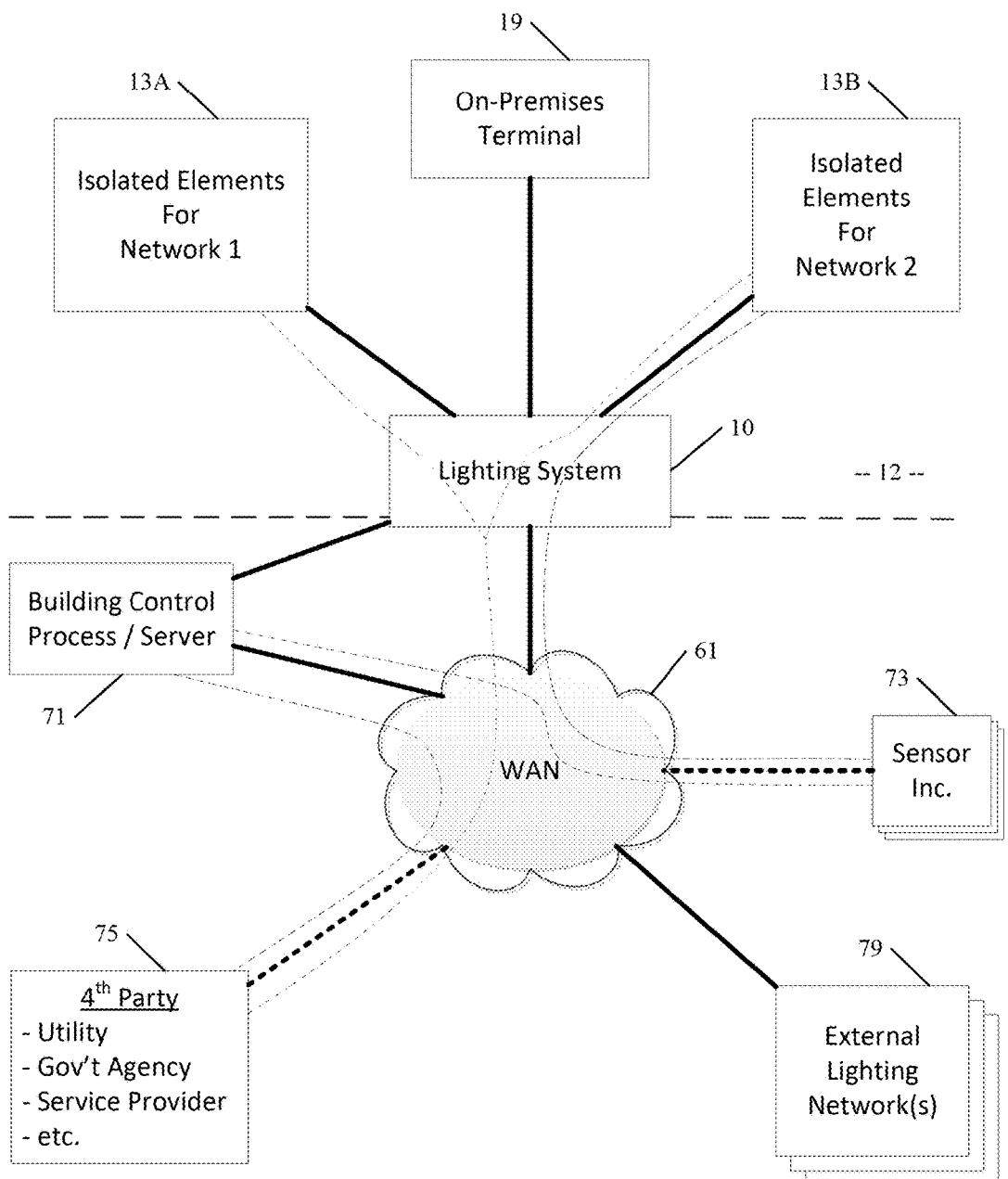

MULTI-NETWORKED LIGHTING DEVICE

CROSS REFERENCE TO RELATED APPLICATION

This application is a Continuation of application Ser. No. 15/653,812, filed on Jul. 19, 2017, which is a Continuation of application Ser. No. 14/708,684, filed on May 11, 2015, now U.S. Pat. No. 9,735,977, issued Aug. 15, 2017, the entire disclosures of which are incorporated herein by reference.

TECHNICAL FIELD

The examples discussed below relate to lighting devices and lighting systems wherein the lighting devices include multiple network interfaces in order to isolate portions of data. Further data isolation may be achieved within a lighting device through the use of multiple similar and/or identical elements or via virtualization of elements within the lighting device.

BACKGROUND

Electrical lighting has become commonplace in modern society. Electrical lighting devices are commonly deployed, for example, in homes, buildings of commercial and other enterprise establishments, as well as in various outdoor settings. Even in a relatively small state or country, there may be millions of lighting devices in use.

Traditional lighting devices have tended to be relatively dumb, in that they can be turned ON and OFF, and in some cases may be dimmed, usually in response to user activation of a relatively simple input device. Lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often traditional lighting devices are controlled individually or as relatively small groups at separate locations.

With the advent of modern electronics has come advancement, including advances in the types of light sources as well as advancements in networking and control capabilities of the lighting devices. For example, solid state sources are now becoming a commercially viable alternative to traditional light sources such as incandescent and fluorescent lamps. By nature, solid state light sources such as light emitting diodes (LEDs) are easily controlled by electronic logic circuits or processors. Electronic controls have also been developed for other types of light sources. As increased processing capacity finds its way into the lighting devices, it becomes relatively easy to incorporate associated communications capabilities, e.g. to allow lighting devices to communicate with system control elements and/or with each other. In this way, advanced electronics in the lighting devices as well as the associated control elements have facilitated more sophisticated lighting control algorithms as well as increased networking of lighting devices.

There also have been various other initiatives to provide communication networks and automation throughout a home or other type of building. For example, today, many buildings and/or enterprise campuses include local area data communication networks. Increasingly, some of these installations support communications for automated control and/or monitoring purposes, which may use the data network or other communication media in support of control and/or monitoring functions. For example, a building control and automation system may allow personnel of an enterprise to communicate with and control various systems, such as lighting, access control, closed circuit TV and heating-air conditioning and ventilation (HVAC) equipment, at one or more enterprise premises. For home automation, applications are now available to allow a user to operate a mobile device (e.g. smartphone or tablet) to communicate with and control smart devices in the home, such as appliances, HVAC and audio-visual systems. To the extent that these developments in communication and automation have considered lighting, they have only included the lighting related elements as controlled outputs (e.g. to turn ON/OFF or otherwise adjust lighting device output) and in a few cases as sensed condition inputs (e.g. to receive data from light level or room occupancy type sensor devices of the lighting related equipment). The focus of such communication networks or automation systems has instead centered around other perspectives, such as around control of HVAC or other major enterprise systems and/or around the relevant user/data communications aspects (e.g. mobile devices and associated applications).

Conversely, as more and more devices become intelligent and may utilize data communications in support of new features and functions, the demand on data communication within the premises skyrockets. However, some portions of the data, particularly portions of data generated by or within lighting devices, may only be appropriately communicated to one party, such as an owner or resident of a premises, while other portions of the data, including similar or different portions of data generated by or within lighting devices, may only be appropriately communicated to another party, such as a monitoring or service bureau. Given the traditional approach of a single communication interface within an intelligent device and/or a single data network within the premises connecting intelligent devices, isolation of portions of data becomes difficult.

There is room for further improvement.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 3 is an alternate block diagram of such a system, with a higher level illustration of the system and other devices at the premises but useful in understanding examples of various systems/entities that may be involved in communication with lighting system elements and other devices at the premises.

DETAILED DESCRIPTION

Figure 1A:
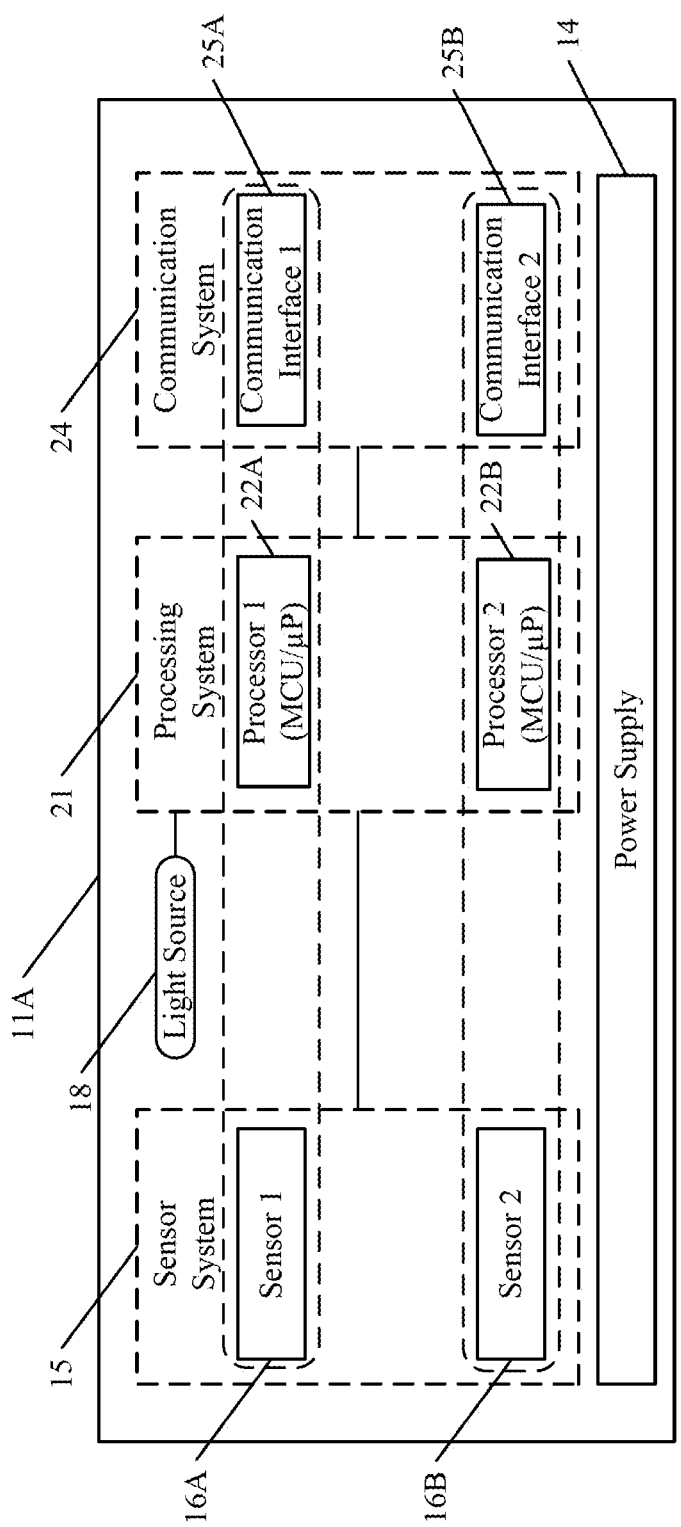
FIG. 1A is a functional block diagram of a simple example of a lighting device having a sensor system with two sensors, a processing system with two processors and a communication system with two communication interfaces in order to provide isolation of data within the lighting device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In the various examples, a first individual, group or organization may occupy or otherwise utilize the premises within which the lighting device or lighting system is installed while one or more other organizations may be responsible for and/or interested in the operation of the lighting device or lighting system and/or conditions sensed within the premises. For example, the first individual, group or organization is a homeowner whose family resides within the premises or a business whose employees conduct activities related to the business within the premises. At the same time, one of the other organizations may be a service bureau or other entity responsible for the maintenance of the lighting device or lighting system within the premises. While the service bureau or maintenance organization has a need to access the lighting device and/or processing capabilities within the lighting device, the service bureau or maintenance organization may not have a need to access information of the occupant, such as information related to one or more conditions sensed within the premises. Alternatively, the service bureau or maintenance organization may have a need to access information related to conditions sensed within the premises, but that same organization does not need to access the lighting device and/or processing capabilities within the lighting device to influence operation of the lighting device or to access any other sensitive information of the occupant.

As a more specific example, a maintenance organization may need to know that the lighting device is properly responding to an occupancy sensor (e.g., lighting device properly turned on when a first person entered and properly turned off when a last person left) and may need to provide software patches or upgrades or the like to the lighting device and/or sensor, but that same maintenance organization need not know when or how the occupancy sensor was triggered. As such, in this more specific example, the first processor of the lighting device would only process data related to functioning of the lighting device in response to the sensed occupancy condition and deliver information related to that processed data via the first network to the maintenance organization and possibly receive communications from that organization. At the same time, the second processor would process the sensed occupancy condition to enable operation of the lighting device and deliver information related to processing of the sensed occupancy condition to the second network.

Each of the various examples of a lighting device or a lighting system including such a lighting device discussed below and shown in the drawings includes or connects to media to form at least two data communication networks within the premises. A first network provides data communications for equipment at the premises and will often provide access to a wider area data network extending outside the premises, for example to an intranet or to a wide area network such as or providing access to the public Internet. A second network provides data communications for equipment at the premises. In some examples, the second network also provides access to the same or a different wider area data network extending outside the premises. In one example, at least a portion of the first data communication network and at least a portion of the second data communication network share the same physical media such that the first and second data networks are virtual or otherwise logical sub-networks within a single physical network at the premises. Alternatively, each data communication network connects via separate physical media such that there are at least two physical networks at the premises.

In the examples, each of the lighting devices has a communication interface system. Each communication interface system includes a first communication interface configured to provide data communication to the first data network and a second communication interface to provide data communication to the second data network. In one example, the first communication interface utilizes a first logical link across a common physical media and the second communication interface utilizes a second logical link across the same common physical media. In an alternative example, the first communication interface utilizes a first physical link to the first data network and the second communication interface utilizes a second physical link to the second data network. In this way, each lighting device may deliver a first portion of isolated data via the first communication interface to the first data network and a second portion of isolated data via the second communication interface to the second data network.

Each lighting device in the various examples also includes a processing system. The processing system in each lighting device includes, for example, a first processor and a second processor. In one example, the first processor is physically separate from the second processor and each processor physically maintains isolation from the other processor. Alternatively, the first and second processors are virtualized instances or otherwise logically separated portions of the same physical processor. In this way, the processing system may isolate a first portion of data from a second portion of data.

Although the multiple communication interfaces and multiple processors support various forms of isolation of data and/or service functions, several specific examples relate to isolation with respect to sensor data. Each lighting device in such an example also includes a sensor system.

In a first sensor data isolation example, the sensor system includes a first sensor and a second sensor. Each of the sensors may be configured to sense the same condition or different conditions and the sensor system is configured to output signals to the processing system responsive to sensed conditions. In this first example, the first sensor is physically separate from the second sensor. Alternatively, the first and second sensors in the first example are virtualized instances or otherwise logically separated portions of the same physical sensor. With either physical or logical separation, a first output signal corresponding to a condition sensed by the first sensor is delivered to the processing system such that the first output signal is delivered to the first processor of the processing system while a second output signal corresponding to a condition sensed by the second sensor is delivered to the processing system such that the second output signal is delivered to the second processor of the processing system. In other words, output signals from the first sensor are only delivered to the first processor and output signals from the second sensor are only delivered to the second processor. In this way, physical and/or logical isolation or separation is maintained throughout the lighting device.

In a second sensor data isolation example, the sensor system includes a sensor configured to sense a condition and output a signal to the processing system responsive to the sensed condition. In this second example, an output signal corresponding to a condition sensed by the sensor is delivered to the processing system such that the output signal is delivered to both the first and second processors of the processing system. In other words, even though a single common condition is sensed, physical and/or logical isolation or separation is created within the processing system of the lighting device. In this way, isolated processing and communication of data related to a common sensed condition may be achieved without multiple sensors sensing the same condition.

In another example, each lighting device has a communication interface system with multiple communication interfaces and a processing system with multiple processors. In this example, programming configures the processing system to isolate data communications received via one of the communication interfaces from being delivered via any of the remaining communication interfaces. That is, if an individual or organization has access via one communication interface to one processor, that individual or organization will not have access via any other communication interface to other resources that may otherwise be available via that other communication interface.

Reference now is made in detail to the examples illustrated in the accompanying drawings and discussed below.

FIG. 1A is a high-level block diagram of an intelligent lighting device 11A, which may be installed either as a stand-alone device or as part of a lighting system within a premises. The term "lighting device" as used herein is intended to encompass essentially any type of device that processes power to generate light, for example, for illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition to light provided for an organism. A lighting device, for example, may take the form of a lamp, light fixture or other luminaire that incorporates a source, where the source by itself contains no intelligence or communication capability (e.g. LEDs or the like, or lamp ("regular light bulbs") of any suitable type). Alternatively, a fixture or luminaire may be relatively dumb but include a source device (e.g. a "light bulb") that incorporates the intelligence and communication capabilities discussed herein. In most examples, the lighting device(s) illuminate a service area to a level useful for a human in or passing through the space, e.g. regular illumination of a room or corridor in a building or of an outdoor space such as a street, sidewalk, parking lot or performance venue. However, it is also possible that one or more lighting devices in or on a particular premises served by a system have other lighting purposes, such as signage for an entrance or to indicate an exit. Of course, the lighting devices may be configured for still other purposes, e.g. to benefit human or non-human organisms or to repel or even impair certain organisms or individuals. The actual source in each lighting device may be any type of light emitting unit.

In the sensor data isolation examples, the intelligence and communications interface(s) and in some cases the sensors are shown as integrated with the other elements of the lighting device or attached to the fixture or other element that incorporates the light source. However, for some installations, the light source may be attached in such a way that there is some separation between the fixture or other element that incorporates the electronic components that provide the intelligence and communication capabilities and/or any associated sensor. For example, the communication component(s) and possibly the processor and memory (the 'brain') may be elements of a separate device or component coupled and/or collocated with the light source.

The lighting device 11A includes a light source 18, a processing system 21, a communication system 24 and a sensor system 15. The lighting device 11A also includes power supply 14 which provides power to the various elements of the lighting device.

The intelligence of lighting device 11A is provided via processing system 21. Processing system 21 includes a first processor 22A and a second processor 22B. Each processor 22A, 22B is configured to process respective data in an isolated fashion, such that data processed by processor 22A remains separate and apart from data processed by processor 22B. In one example, each processor 22A, 22B is based on use of a microcontroller e.g. which incorporates data and program storage, etc. Alternatively, each processor 22A, 22B is based on use of a microprocessor (µP) e.g. which connects to one or more separate storage devices (not shown).

In one example, each processor 22A, 22B is a physically distinct component or set of components within processing system 21. Alternatively, each processor 22A, 22B is a virtualized or otherwise logically isolated instance of a processor utilizing common physical elements within processing system 21.

Each communication interface system 24 includes a first communication interface 25A and a second communication interface 25B configured to enable communication via links to a first and second data networks. As described in greater detail below, various network media and protocols may be used for the data communications. The communication interfaces 25A, 25B will correspond to the physical, electrical and signaling protocol requirements of the particular technology adopted for each of the first and second data networks in the particular premises or area of the premises. For example, if the first data network is a wired Ethernet network, interface 25A will include an appropriate Ethernet cable connector as well as an Ethernet card to enable the lighting device 11 to communicate data in electrical Ethernet signals and data protocols over the respective wired Ethernet link. In a similar example, if the second data network is a wireless network (e.g., Wi-Fi, Bluetooth, ZigBee, etc.), interface 25B will include appropriate electronics to enable wireless data communication via the particular wireless network technology.

In one example, each communication interface 25A, 25B is a physically distinct component or set of components within communication system 24 and, as such, provides physical isolation of respective data delivered via each communication interface 25A, 25B. Alternatively, each communication interface 25A, 25B is a virtualized or otherwise logically isolated instance of an interface utilizing common physical elements of communication system 24 and, as such, provides logical isolation of delivered data. For example, the first communication interface 25A may represent one end-point of a first virtual private network (VPN) or one node within a first virtual local area network (VLAN) while the second communication interface 25B represents one end-point of a second VPN or one node within a second VLAN. In this way, communication system 24, as described in greater detail below, provides isolation between a first portion of data to be delivered to a first data network and a second portion of data to be delivered to a second data network. Although the examples presented so far have focused on isolation of data generated or otherwise processed within lighting device 11A for delivery to the first and second networks, it is contemplated that data received from the networks may also similarly be isolated within the device 11A.

In the example of FIG. 1A, sensor system 15 includes a first sensor 16A and a second sensor 16B. As such, it may be helpful to next discuss various examples of sensors.

Any sensors included in sensor system 15 also have or are associated with intelligence and communication capabilities. In particular, processing system 21 and communication system 24 of lighting device 11A provide the intelligence and communication capabilities associated with sensors 16A, 16B. Each sensor 16A, 16B includes a physical condition detector (not separately shown), which is the actual device that is responsive to the particular condition to be sensed. The detector may receive a drive signal; and in response to the sensed condition, the detector produces a signal having a characteristic (e.g. voltage magnitude) that is directly related to a characteristic level of the sensed condition. Each sensor 16A, 16B also includes a detector interface circuit (not separately shown). The circuit provides any drive signal that may be needed by the particular device type of physical condition detector and provides one or more sensed condition outputs. As such, each sensor 16A, 16B generates a signal responsive to each respective condition sensed and sensor system 15, in turn, delivers each of the respective responsive signals to processing system 21 (e.g., one signal responsive to the condition sensed by sensor 16A and one signal responsive to the condition sensed by sensor 16B). Of note, while sensor system 15 includes two sensors 16A, 16B each configured to sense a respective condition, both conditions to be sensed may not occur simultaneously or otherwise within a similar amount of time. As such, while sensor system 15 is configured to output multiple signals (e.g., at least one signal corresponding to sensor 16A and at least one signal corresponding to sensor 16B), sensor system 15 may not output multiple signals at the same time or otherwise within a similar amount of time. The output signal or signals may be analog or digital.

As shown by the discussion above, each system (e.g., sensor system 15, processing system 21 and communication system 24) within lighting device 11A is able to provide isolation between a first portion of data and a second portion of data within the respective system by utilizing two physical or logical instances of corresponding elements (e.g., sensors 16A, 16B, processors 22A, 22B, and communication interfaces 25A, 25B). At the same time, isolation between the first and second portions of data is maintained as those portions of data are passed through lighting device 11A by enforcing relationships among respective elements. That is, in one example, the first sensor 16A only delivers information related to conditions sensed by sensor 16A to the first processor 22A and the first processor 22A only delivers data related to processing of those sensed conditions to the first communication interface 25A. Likewise, the second sensor 16B only delivers information related to conditions sensed by sensor 16B to the second processor 22B and the second processor 22B only delivers data related to processing of those sensed conditions to the second communication interface 25B. Although not explicitly shown, isolated data storage within one or more of the various systems and/or located as a common element(s) within device 11A may also be utilized, at least on a temporary basis before or as part of delivery between the various systems, in order to preserve isolation of the data portions. In this way, isolation between the first and second portions of data is maintained throughout lighting device 11A.

Lighting device 11A, via power supply 14, may draw power from an AC grid or from a DC grid. Lighting device 11A, for example, may draw power from alternating current (AC) mains in the building or other type of premises where lighting device 11A may be installed. In an AC grid type example, the power supply 14 will include a light source driver circuit to process power drawn from the AC mains in any manner as may be appropriate to drive the particular type of light source 18 incorporated in the particular lighting device 11A. The source driver may be a simple switch controlled by the processor, for example, if the source is an incandescent bulb or the like that can be driven directly from the AC current. As another example, the drive circuit may convert AC power to one or more appropriate DC voltage and/or current levels to provide power to DC driven light source(s) such as light emitting diodes (LEDs). The power supply would also process AC power from the mains to provide voltage and/or current levels to power the elements (e.g. processing system 21, sensor system 15 and communication system 24) serving as the device intelligence and for the communication interface.

In the example, the power supply 14 receives electricity from AC mains, however, lighting device 11 may be driven by a battery or other power source for a particular application. For example, lighting device 11 may have or connect to a back-up battery or other back-up power source to supply power for some period of time in the event of an interruption of power from the AC mains.

As discussed above and further below, various individuals, groups and/or organizations may be interested in information generated by or otherwise processed within lighting device 11A. These various entities may also be interested in providing information to or otherwise participating in monitoring and/or management of the device 11A. Each individual entity, however, may not need or otherwise be allowed to access all of the information available in conjunction with device 11A. Isolating individual elements within lighting device 11A as well as information manipulated within device 11A allows each individual entity to interact with information in an appropriate fashion.

In various examples, sensors 16A, 16B of sensor system 15 are each configured to sense different conditions. That is, sensor 16A is configured to sense a first condition while sensor 16B is configured to sense a second condition. Alternatively, sensors 16A, 16B are each configured to sense the same condition. However, due to relationships enforced between sensor system 15 and processing system 21, information related to the condition sensed by sensor 16A is only delivered to processor 22A while information related to the condition sensed by sensor 16B, whether the same condition or a different condition, is only delivered to processor 22B. In FIG. 1A, such enforced relationships are depicted with a first dashed rectangle encompassing sensor 16A, processor 22A and communication interface 25A as well as a second dashed rectangle encompassing sensor 16B, processor 22B and communication interface 25B. Although not explicitly shown, these relationships are enforced, for example, physically, such as via direct connections or paths between elements, or logically via software or other logic controlling the flow of information between elements.

Figure 1B:
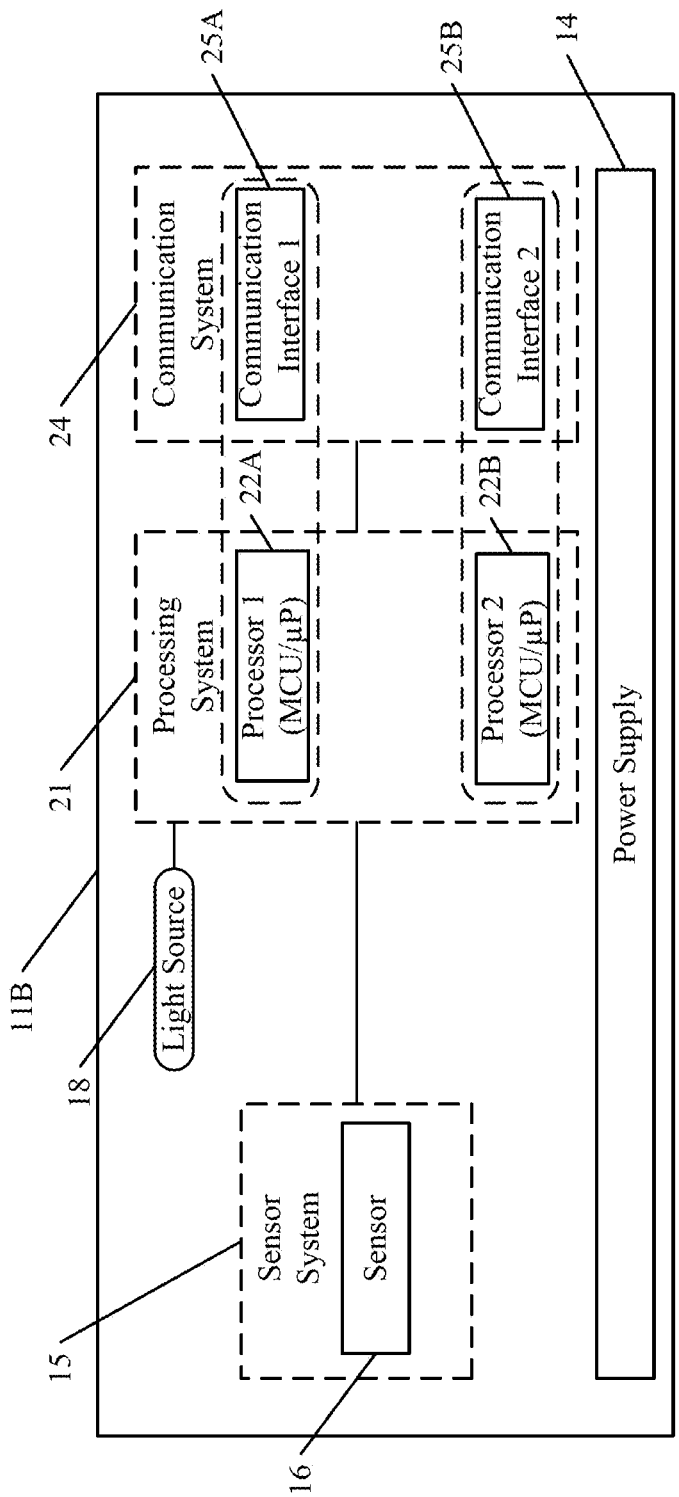
FIG. 1B is an alternate block diagram of such a lighting device having a sensor system with one sensor.

FIG. 1B is a high-level block diagram of lighting device 11B including an alternate example of sensor system 15. As discussed above, when information related to the same sensed condition is to be delivered to both processors 22A, 22B, two sensors configured to sense that same condition may be unnecessarily redundant. As such, sensor system 15 of FIG. 1B only includes one sensor 16. In addition, a relationship is enforced between sensor system 15 and processing system 21 such that information related to the condition sensed by sensor 16 is delivered to both processors 22A, 22B. In one example, sensor system 15 outputs the single signal generated by sensor 16 to processing system 21 and processing system 21 splits, duplicates or otherwise distributes the single signal to the processors 22A, 22B. Alternatively, sensor system 15 splits, duplicates or otherwise generates at least two signals responsive to the condition sensed by sensor 16 and outputs the multiple signals to processing system 21 in accordance with an enforced relationship (e.g., one of the output signals to be delivered to processor 22A and one of the output signals to be delivered to processor 22B). Data separation for different entities, however, is maintained by use of separate processors and separate communication interfaces.

It should be noted that the previous examples are based on an assumption that only two conditions are to be sensed or that a single sensed condition is to be processed in two different ways. Although not explicitly shown, however, any number of different conditions may be sensed by including corresponding sensors within sensor system 15. In addition, sensor system 15 may include both sensor 16 configured to sense a condition for which related information is to be delivered to both processors 22A, 22B as well as sensors 16A, 16B configured to sense conditions for which respective related information is to be delivered only to respective processors 22A, 22B. That is, sensor system 15 is intended to be sufficiently scalable so as to support any number of variously different environments for either or both of the involved entities (their processors and communication interfaces). What is significant is that only some first portion of information related to the various conditions sensed is delivered to the first processor 22A while only some second portion of information related to the various conditions sensed is delivered to the second processor 22B for attendant processing and separate communications access.

The benefits of isolation within each system of and throughout lighting device 11A, 11B include the ability to provide different types of varying access to different individuals, groups or organizations that may be interested in lighting device 11A, 11B and/or information processed by the device 11A, 11B. As mentioned above, for example, occupants of the premises may be interested in detailed information related to conditions existing within the premises and sensed by sensor system 15 while an organization responsible for the maintenance of lighting device 11A, 11B may only be interested in the performance of the device 11A, 11B. Alternatively, or in addition, the occupants may not want the maintenance organization to have access to the more detailed information that may be available to the occupants via the lighting device 11A, 11B. By enforcing relationships between elements (e.g. sensors 16, 16A, 16B, processors 22A, 22B, and communication interfaces 25A, 25B) of the various systems (e.g., sensor system 15, processing system 21, and communication system 24) within lighting device 11A, 11B, these different types of varying access can be provided. Although various examples are presented in terms of data and communication of such data to/from lighting device 11A, 11B, the isolation described herein is not so limited as to only apply to such data and/or such data communication. In addition, such isolation may be enforced to limit inappropriate access by one party not only to system(s) within lighting device 11A, 11B, but also to other resources of another party external to and otherwise capable of communication with lighting device 11A, 11B.

Figure 1C:
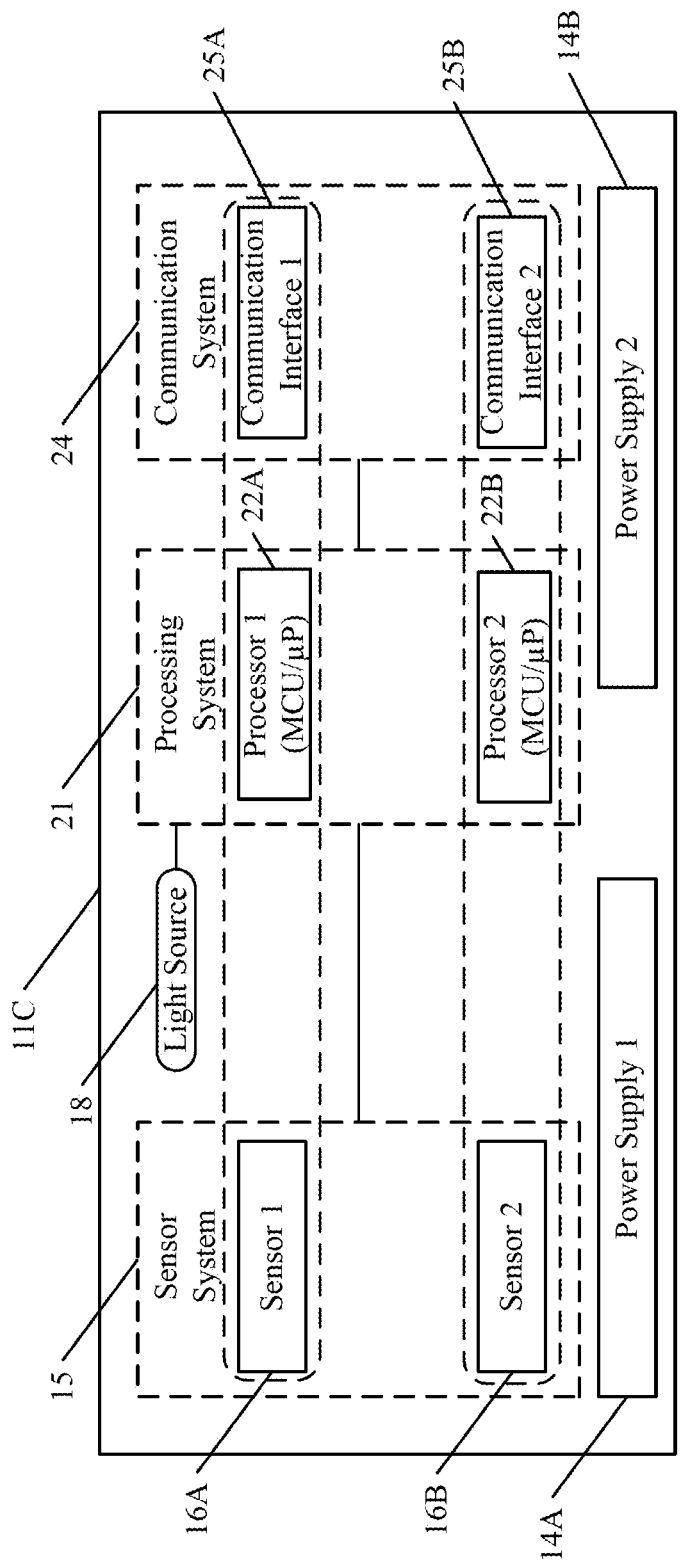
FIG. 1C is a functional block diagram of another example of a lighting device similar to that of FIG. 1A with a first power supply providing power to the first sensor, the first processor and the first communication interface as well as a second power supply providing power to the second sensor, the second processor and the second communication interface.

In some examples, however, providing different types of varying access is insufficient to completely secure the information available from lighting device 11A, 11B. Thus, FIG. 1C is a high-level block diagram of an alternate example of lighting device 11C wherein a first power supply 14A provides power to some of the elements within the various systems (e.g., sensor 16A, processor 22A and communication interface 25A) while a second power supply 14B provides power to other elements within the various systems (e.g., sensor 16B, processor 22B and communication interface 25B). By providing separate power supplies for separate elements, power to each group of elements may be controlled individually. In this way, some amount of access to lighting device 11C may be completely eliminated without eliminating all access. For example, if the previously mentioned maintenance organization becomes compromised, such as via a hack, social engineering or some other form of cyberattack, power to only those elements configured to provide information to the maintenance organization can be turned off and any potential exposure to the occupants' information can be limited. Once the maintenance organization has addressed the compromise, in this example, power to those elements affected can be turned back on.

Figure 1D:
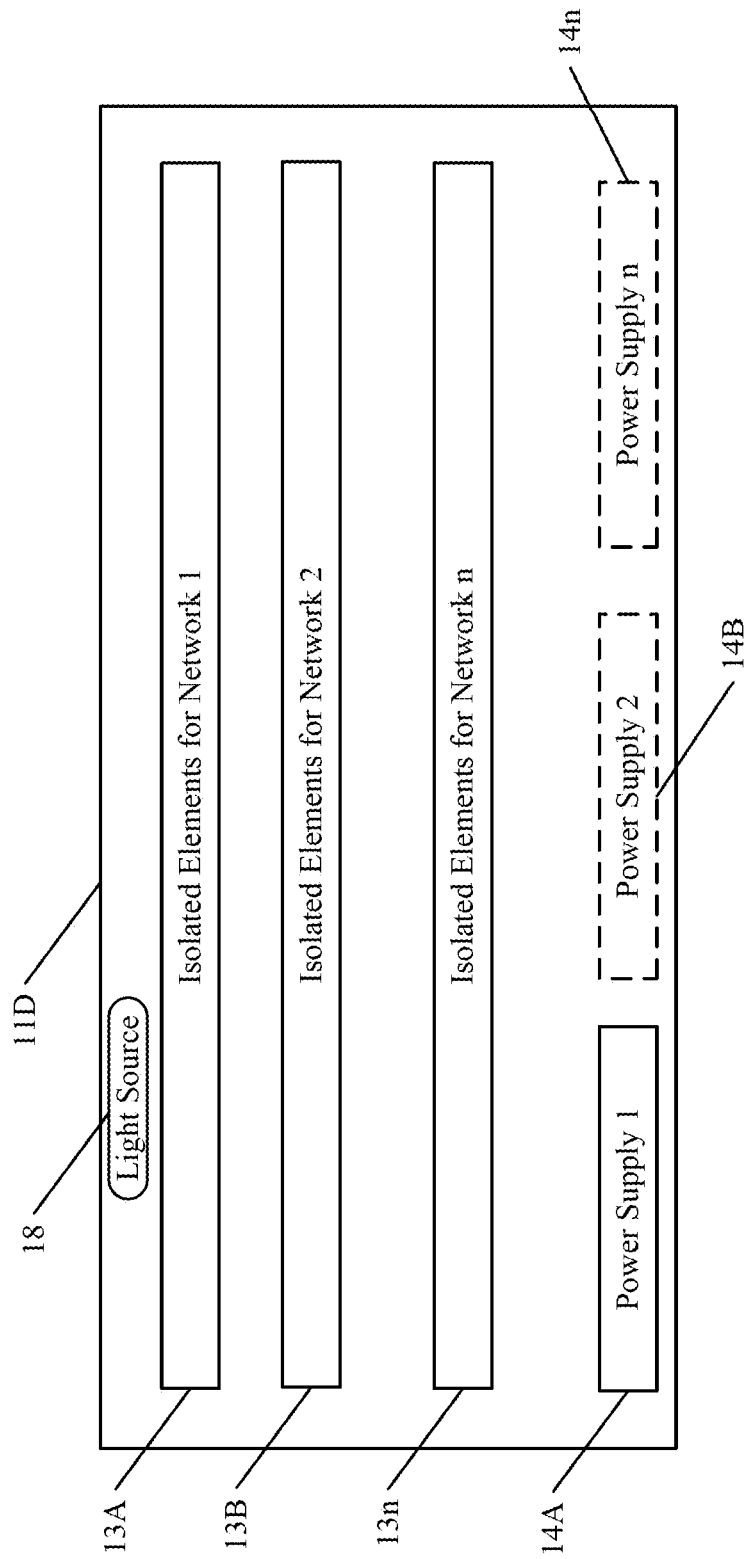
FIG. 1D is a functional block diagram of a further example of a lighting device having one to n power supplies providing power to a sensor system having n sensors, a processing system having n processors and a communication system having n communications interfaces.

As mentioned above, sensor system 15, processing system 21 and communication system 24 of lighting device 11A, 11B, 11C are intended to be scalable. FIG. 1D is a high-level block diagram of device 11D that illustrates such scalability. Generally, those elements within the various systems for which isolating relationships are enforced to provide data for communication via the different data networks are depicted as individual blocks. More specifically, a first block of isolated elements for network 1 (e.g., sensor 16A, processor 22A and communication interface 25A)

13A, a second block of isolated elements for network 213B and an nth block of isolated elements for network n 13n are depicted. In addition, n power supplies 14A, 14B and 14n are depicted. Of note, power supplies 14B, 14n are depicted with dashed lines as an indication that each power supply may either be a physically distinct supply or a logical supply utilizing a common physical supply. Also, a single power supply may be used similar to the examples of FIGS. 1A and 1B. As can be seen, systems and elements within lighting device 11D can be scaled in order to meet varying demands of various individuals, groups or organizations.

Although the previous examples have described isolating data produced and processed by a lighting device 11 for communication via different networks to different destinations, no such unidirectional requirement exists. Instead, lighting device 11 also provides isolation for data received via the different networks. For example, the maintenance organization is able to access a respective processor via a respective communication interface in order to provide command and control functions. As a further example, the maintenance organization may access processor 22A in order to provide an update and/or modification to how processor 22A processes information related to conditions sensed by sensor system 15. At the same time, such update and/or modification should not be applied to processor 22B. As such, isolation within lighting device 11 only allows the maintenance organization to access processor 22A via communication interface 25A. In this way, isolation within lighting device 11 is utilized in a bidirectional fashion to provide the different types of varying access. In addition, such isolation limits appropriate bidirectional access only to/from appropriate elements within lighting device 11 without providing access through lighting device 11 to other inappropriate resources. That is, while the maintenance organization has access to processor 22A, the maintenance organization does not have access via communication interface 25B to other resources or devices that might otherwise be available via interface 25B. In other words, data communications received via communication interface 25A are isolated within lighting device 11 such that those data communications are not delivered via communication interface 25B.

It might be helpful to next discuss an example of how lighting device 11 might be installed as part of a lighting system within a premises.

Figure 2A:
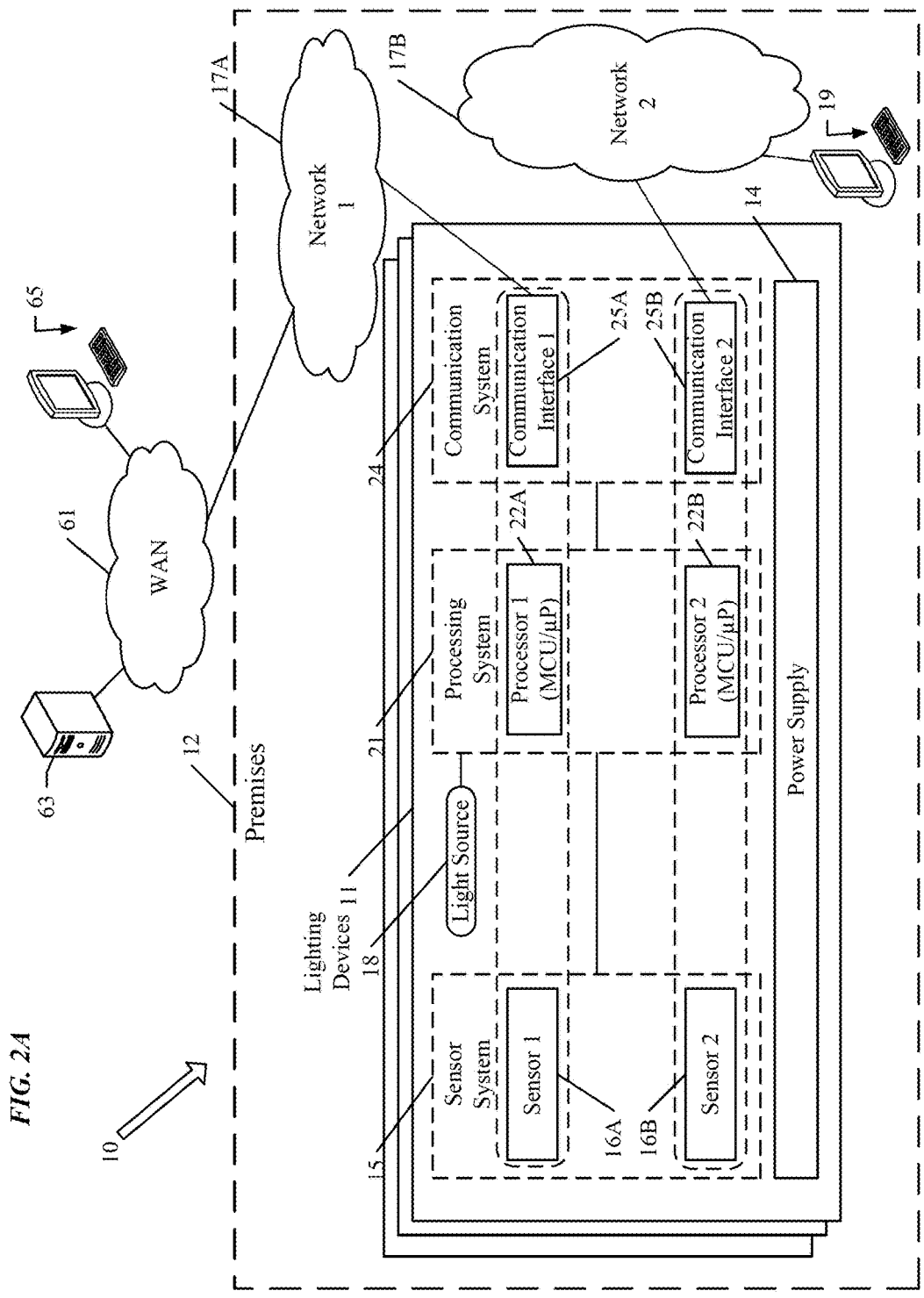
FIG. 2A is a functional block diagram of a simple example of a system having intelligent lighting devices, such as the lighting device of FIG. 1A, linked or networked for data communications with two data networks such that isolated data from one communication interface is delivered to one network and isolated data from the other communication interface is delivered to the other network.

FIG. 2A is a high-level block diagram of a networked lighting system 10, many elements of which are installed at a premises 12. The premises 12 may be any location or locations serviced for lighting and other purposes by a networked intelligent lighting system of the type described herein. Most of the examples discussed below focus on building installations, for convenience, although the system may be readily adapted to outdoor lighting. Hence, the example of system 10 provides lighting and possibly other services in a number of service areas in or associated with a building, such as various rooms, hallways, corridors or storage areas of a building and an outdoor area associated with a building. Any building forming or at the premises, for example, may be an individual or multi-resident dwelling or may provide space for one or more enterprises and/or any combination of residential and enterprise facilities. The system also may span some number of buildings, e.g. one or more locations or campuses of an enterprise.

The lighting system elements, in a system like system 10 of FIG. 2A may include any number of lighting devices 11, such as fixtures and lamps, as well as lighting controllers (now shown), such as switches, dimmers and smart control panels. The lighting system elements may also include one or more sensors used to control lighting functions, such as occupancy sensors, ambient light sensors and light or temperature feedback sensors that detect conditions of or produced by one or more of the lighting devices. As discussed above, such sensors may be incorporated in intelligent lighting devices, e.g. as an enhanced capability of a lighting device, or in standalone sensor or user interface devices. For convenience, the drawings show sensors incorporated within the lighting devices.

The lighting devices 11 are coupled to and communicate via a first and second data networks 17A, 17B at the premises 12. Hence, in our example, each room or other type of lighting service area illuminated by the system 10 includes a number of lighting devices 11 as well as other system elements (not shown) such as one or more user interface (UI) devices each configured as a lighting controller or the like.

A room or other service area will often have an appropriate number of lighting devices 11, for example, to provide a desired level of lighting for the intended use of the particular space. In many installations, the equipment in the service area also includes a user interface (UI) device, which in this example, serves as a first lighting controller. In a similar fashion, the equipment in the service area may include one or more sensors, each of which may be in or closely associated with one of the lighting devices 11 as represented by the sensor system 15. Examples of lighting operation related sensors include occupancy sensors and sensors of one or more light characteristics (e.g. for sensing level and/or color characteristic(s) of ambient light in the service area and/or of light produced in or output by one or more of the lighting devices 11 that illuminates the service area). Other sensors may detect other conditions that are relevant to other functions of the system or for more general communication about conditions in an area for still further purposes, such as temperature or humidity for HVAC control or vibration for reporting of earthquakes or similar events, microphones, still or video cameras, directional optical sensors such as a quadrant hemispherical light detector or "QHD" (see e.g. U.S. Pat. Nos. 5,877,490 and 5,914,487), etc. Other examples of conditions that may be detected by appropriate sensors include a security condition, an accident/collision detection, an object/occupant identification, etc. Different sensors for different types or sets of conditions may be relevant in different system installations, e.g. some of these examples might be more relevant in warehouse type system applications.

For lighting operations, the lighting system elements for a given service area, including lighting devices 11, are coupled together for network communication with each other through data communication media to form a portion of one or more physical data communication networks. Similar elements in other service areas of the premises are coupled together for network communication with each other through data communication media to form one or more other portions of the physical data communication networks at the premises 12. The various portions of the networks in the service areas in turn are coupled together to form data communication networks at the premises, for example to form local area networks (LANs) or the like, as generally represented by the clouds 17A, 17B in the drawing. Any suitable LAN media may be used, such as power lines wiring, separate wiring such as coax or Ethernet cable, optical fiber or wireless (e.g. pico/femto cell, Zigbee, Bluetooth or WiFi). Some or all of the network communication media may be used by or made available for communications of other gear, equipment or systems within the premises. A premises wide network may include additional links and/or network gear (e.g. router, gateway, firewall, or the like) to couple the various devices together into one or more overall networks for the premises. A LAN as discussed here need not be a LAN of the type typically used today for computer or mobile device communications within a particular premises, although the lighting system may use or connect to such a network. For purposes of the present discussion, a LAN is a premises network for data communications among the lighting system elements and other devices within the premises and for data communications to/from the wide area network as discussed herein.

Figure 2B:
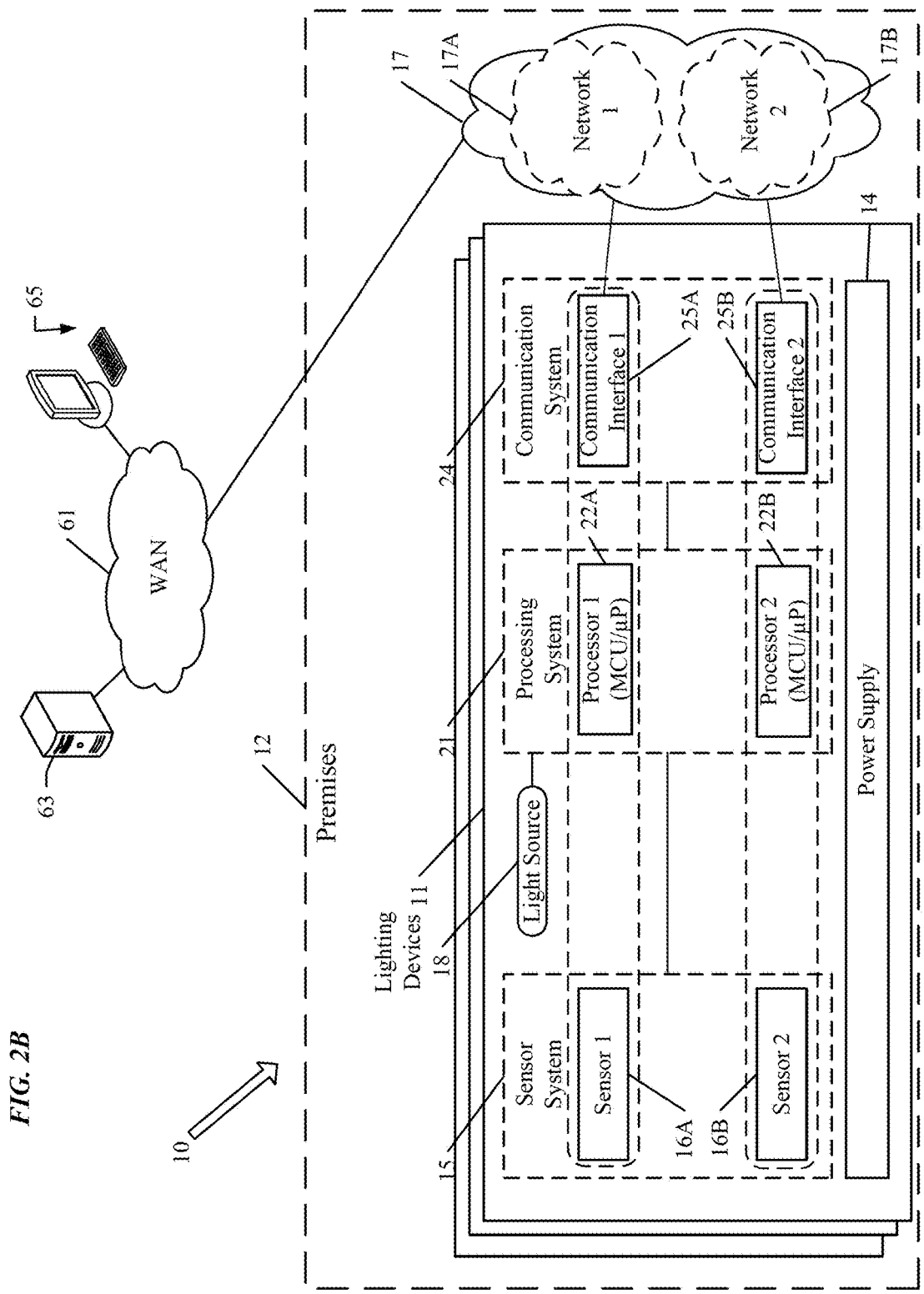
FIG. 2B is a functional block diagram of an alternate example of the intelligent lighting device system of FIG. 2A depicting each of the two data networks as isolated portions of a common network.

As depicted in FIG. 2B, there may be one overall physical data communication network 17 at the premises 12 and each data network 17A, 17B may be a virtually or logically isolated portion within that common physical infrastructure. However, for larger premises and/or premises that may actually encompass somewhat separate physical locations, each data network 17A, 17B may actually be built of somewhat separate physical networks, as represented in FIG. 2A. Although not explicitly shown, while each data network 17A, 17B utilizes separate physical infrastructure in order to provide isolation, data networks 17A, 17B, in at least one example, are interconnected or otherwise share a common connection point, such as at a gateway to a wide area network (WAN) or the Internet.

The data communication networks 17A, 17B allow lighting devices 11 within the premises 12 to communicate with each other and communicate via the wide area network WAN 61, so as to communicate with other devices generally represented by way of example by the server/host computer 63 and the user terminal device 65. As depicted in FIG. 2A, only data network 17A provides such wide area access to lighting devices 11 and only those elements within lighting device 11 with connectivity to data network 17A (e.g., sensor 16A, processor 22A and communication interface 25A) are accessible to/from such WAN 61. However, as depicted in FIG. 2B, when data networks 17A, 17B share, for example, at least some common portion of a physical network, such as physical data communication network 17, both data networks 17A, 17B can provide access to/from WAN 61 for all corresponding elements of lighting device 11. Alternatively, each data network 17A, 17B may have an independent interconnection with WAN 61 or some other WAN (e.g. one to the Internet and the other to a VPN or Intranet).

A host computer or server like 63 can be any suitable network-connected computer, tablet, mobile device or the like programmed to implement desired network-side functionalities. Such a device may have any appropriate data communication interface to link to the WAN 61. Alternatively or in addition, a host computer or server similar to 63 may be operated at the premises 12 and utilize the same networking media that implements data networks 17A, 17B.

The user terminal equipment such as that shown at 65 may be implemented with any suitable processing device that can communicate and offer a suitable user interface. The terminal 65, for example, is shown as a desktop computer with a wired link into the WAN 61. However, other terminal types, such as laptop or notebook computers, tablet computers, ultrabook computers, netbook computers, and smartphones, may serve as the user terminal computers. Also, although shown as communicating via a wired link from the WAN 61, such a device may also or alternatively use wireless or optical media. Similarly, user terminal 19, similar to user terminal equipment 65, may be operated at the premises 12 and utilize the same networking media that implements data network 17B. Although not separately shown, an occupant or the like may have a variety of other data devices at or off premises that have communication access to network 17B. The isolation in the lighting device 11, however, protects such other data devices from access by users or devices via network 17A.

For various reasons, the communications capabilities provided at the premises 12 may also support communications of the lighting system elements with user terminal devices and/or computers within the premises, such as user terminal 19. The user terminal devices and/or computers within the premises may use communications interfaces and communications protocols of any type(s) compatible with the on-premises networking technology of the system 10. Such communication with a user terminal, for example, may allow a person in one part of the premises 12 to communicate with a lighting device 11 in another area of the premises 12, to obtain data therefrom and/or to control lighting or other system operations in the other area.

The external elements, represented generally by the server/host computer 63 and the user terminal device 65, which may communicate with the system elements at the premises, may be used by various entities and/or for various purposes in relation to operation of the lighting system 10. However, as discussed above and further below, isolation within each system of and throughout lighting device 11 ensures that such external or internal elements (e.g., server/host computer 63, user terminal 65, user terminal 19), as operated by the various entities, are not able to inappropriately access unintended resources.

FIG. 3 is an alternate diagram of the system 10, with a higher level illustration of the system 10 at the premises 12 but also showing logical organizations and examples of various systems/entities outside the premises 12 that may be involved in separated communications with lighting devices 11 at the premises 12. It should be noted also that, although FIG. 2A depicted a system 10 of a single premises, in practice there may be similar systems installed any number of premises at diverse locations, as will be discussed further as part of the description relative to FIG. 3.

For discussion purposes, some of the drawings and some of this description refer to third ($3^{rd}$) and fourth ($4^{th}$) parties. This nomenclature distinguishes other parties from the party or parties that install and maintain the lighting system as well as the party or parties owning, operating or occupying the premises 12. In FIG. 3, examples of third parties would be various enterprises that manufacture, install or maintain appliances, sensors and other devices at the premises. As will be discussed, these parties may also operate various external equipment that communicates with their devices at the premises 12, for example to receive sensor data, to monitor operations of their devices, to provide maintenance services relative to their devices, etc. Fourth parties are other entities (enterprises or individuals) who may have at least some more indirect interest in the premises 12 or the system 10 or the lighting devices 11 installed at the premises. For example, some such fourth parties may have an interest in sensor or equipment monitoring data from any number of premises like 12, or these other entities or parties may have some interest in occasional control of equipment at various different premises 12.

For convenience, FIG. 3 shows two isolated elements blocks 13A, 13B. As discussed above in relation to FIG. 1D, each isolated elements block 13A, 13B represents those elements within the various systems of lighting devices 11 (e.g., sensor 16A, processor 22A and communication interface 25A) for which isolation is being enforced. One such isolated elements block 13A represents those isolated elements for which access is to be provided to third parties, such as one or more parties other than the enterprise(s) that sell and service the lighting devices. Alternatively, or in addition, isolated elements block 13A represents the party that sells and services the lighting devices. Another such isolated elements block 13B represents those isolated elements for which access is to be provided to the party owning, operating or occupying the premises 12. Although FIG. 3 only depicts two such isolated elements blocks, as discussed above in relation to FIG. 1D, multiple (n) isolated elements blocks may be deployed within various lighting devices 11 of system 10. FIG. 3 also shows an on-premises user terminal 19 as similarly depicted in FIG. 2A.

FIG. 3 also generally shows the lighting system 10. In this context, the system 10 includes all of the intelligent lighting devices 11 and the data networks 17A, 17B discussed above relative to FIG. 2A. Also, the isolated elements blocks 13A, 13B communicate with and through the lighting system 10, as outlined above relative to FIG. 2A. FIG. 3 also shows the WAN 61 and the connection thereof to the lighting system 10. This arrangement allows the lighting devices 11 and the isolated elements 13A, 13B to communicate with any of a wide range of other systems or terminal devices outside of the particular premises 12. As will be discussed more later, this allows the lighting system 10 to communicate with other lighting networks or systems as shown at 79 in FIG. 3.

The intelligent lighting devices 11, and more specifically isolated elements 13A, 13B, may communicate with equipment outside the premises for a variety of purposes. For example, such isolated elements 13B may communicate with server equipment or user terminal equipment, to allow the owner or occupants of the premises to remotely monitor and/or control lighting in the premises 12, while other elements 13A, as well as resources and/or devices otherwise accessible via elements 13A, remain inaccessible to equipment of that entity. As another example, the isolated elements 13A may communicate with server equipment or user terminal equipment of the vendor(s) of those elements 13A or another enterprise having a contract for service or maintenance of the lighting system at the premises 12, while elements 13B, as well as resources and/or devices otherwise accessible via elements 13B, for the owner or occupant remain inaccessible to the lighting service enterprise.

For example, isolated elements 13A may communicate with a building control or process server shown at 71 in FIG. 3. Such a building control server 71 may operate as a service bureau to provide overall building control for many of the automated systems and devices at premises 12 (and possibly at other customers' similar equipped premises). The communications here between the building control server 71 and the isolated elements 13A, for example, allow the server 71 to monitor and in some cases control operations of lighting devices 11 within the premises 12. The server 71 may also be able to obtain data from sensor 16A. At the same time, elements 13B, as well as resources and/or devices otherwise accessible via elements 13B, are inaccessible to the server 71.

The building control process/server 71 in the illustrated example is outside the premises; although the server 71 may be operated logically or physically from within the premises 12, depending on the entities operating the server and/or those using the functionalities supported by the server. For example, one enterprise might offer building control as a contracted service bureau type service using external servers 71, as outlined above. Conversely, a home owner or an enterprise operating at the premises 12 may instead prefer its own internal building control in which case the server may be on the premises 12 either on a standalone platform or implemented as a distributed processing function on two or more of the intelligent lighting devices 11 at the particular premises 12.

Although referred to as third or fourth party communication, the external communication access offered by the system 10 and the WAN 61 may also allow a user in the home or in an enterprise type of premises 12 to interact with and/or control devices in the home, e.g. to run an app on a cell phone to monitor and control lighting and/or other devices in the premises from within the premises or remotely (either directly or via an intermediate server).

The example of FIG. 3 also includes outside equipment of one or more sensor companies as shown at 73. The equipment 73 of a sensor company may take the form of a server alone or in combination with one or more user terminal device(s) for personnel of that enterprise. As noted earlier, any number of sensors 16A, 16B may be installed and/or monitored by third parties. For example, a security monitoring company might operate equipment 73 to monitor fire, smoke, gas (e.g. $CO_2$ or natural gas leakage) and unauthorized entry sensors at the premises, using one of the data networks 17A, 17B and the data communication functions offered by the lighting system 10. Various communication models (e.g. polling type 'pull' data communication, periodic reporting or event responsive reporting) may be used to allow the equipment 73 to collect data from some number of isolated sensors monitored by the particular sensor enterprise. Equipment 73, however, would have access only to the appropriate in-premises sensor data/elements, not to isolated elements. The equipment 73 may make the sensor data available to personnel of that enterprise for various enterprise purposes. Alternatively or in addition, the equipment 73 may trigger responsive action, e.g. dispatch personnel to respond to an undesired condition or initiate a report to public emergency response personnel.

The example of FIG. 3 also includes outside equipment of one or more other ($4^{th}$) parties, as shown at 75. Depending on the entity and the relationship(s) with the various parties involved at or with monitoring/servicing the lighting system 10 and the isolated elements 13A, 13B, the equipment may communicate only with the respective isolated elements 13A, 13B. Again, various communication models may be used to collect information from various equipment at the premises 12 to which outside equipment 75 is allowed access.

A utility, such as an electric company supplying power to the premises, may use such equipment 75 and network communications to collect power usage data from the lighting system 10 at the premises 12, e.g. to provide a more granular view as to actual consumption at the premises 12 and any number of other similarly equipped premises. When appropriate, e.g. at a time of excessive demand in a geographic area encompassing the premises 12, the utility might control some elements or devices at the premises to reduce consumption. Of course, a utility may implement other forms of control, e.g. to shift some high-power consuming operations to off-peak times. The owner/occupant of the premises, in turn, may receive a lower power rate in exchange for agreeing to at least some such control by the utility. As another example of power company interaction, the lighting system elements and/or the other devices at the premise 12 may allow monitor signals on the power line report whether any equipment is causing transients that may reduce efficiency to equipment 75 of a power company, for corrective control or other maintenance purposes. The isolation, however, would effectively block utility company access to data or equipment of the owner/occupant that would otherwise be accessible via lighting system 10 or other entities having their own isolated access within the system 10.

Some government agencies may also have an interest in collecting data from and/or controlling some of the isolated elements 13A, 13B and various premises like 12. For example, where a sensor company might collect vibration data for analysis of machinery operating at the premises 12, a government geological agency might collect vibration data from the same or others of the isolated elements 13A, 13B as a way to detect and analyze seismic activity. Seismic data from a number of premises in a major geographic region (e.g. a metropolitan area) might thereby provide insight into the breadth of an earthquake and the distribution pattern of various levels of quake intensity across the geographic region over the time period of a seismic event. In a similar fashion, a weather agency (or a separate contractor) might collect data from sensors of various types forming weather stations at a number of premises like 12 across a geographic region. In the event of an emergency, occupancy sensors might provide responsive government personnel with information about which rooms/buildings are occupied. Like the utility example, agency access would be limited to only the appropriate isolated system assets and data generated or contained therein.

External lighting networks 79 are similar to networked system 10 albeit located at other premises, for example, as manufactured, installed and/or maintained by the entity or entities that manufactured, installed and/or maintain the system 10 at premises 12. The other networks/systems 79 may be at premises of the same entity that owns, operates or occupies the particular premises 12 or at premises of one or more other entities. External lighting networks 79 in the example, however, are also meant to encompass networks/systems of the vendor or other lighting service/maintenance entity. In an example in which one or more external lighting networks 79 are system/networks similar to system 10 of FIG. 2A but at other premises, communication with such other similar networks 79 may be desirable to an enterprise that owns or operates at the other premises as well as the premises 12. However, the external lighting networks may be other networks installed or serviced by the same enterprise entity as the system at premises 12 but occupied by different entities. In either case, communications via the network 61 enable the on premises system 10 and such external networks to interact and cooperate in operational data sharing and service/maintenance functions in an appropriate fashion based on relationships enforced by the isolation discussed herein. Server and/or user terminal devices for technicians of an installation and/or service entity may be included in or communicate via one of the networks represented by the external network 79 in our example, although such server or terminal devices may utilize other communications networks for data access to the WAN 61.

These are but a few examples of how 3$^{rd}$ or 4$^{th}$ parties might collect and use data in an isolated fashion from premises that have an installation of a lighting system 10 and isolated elements 13A, 13B that communicate through that system and the WAN 61.

Figure 6:
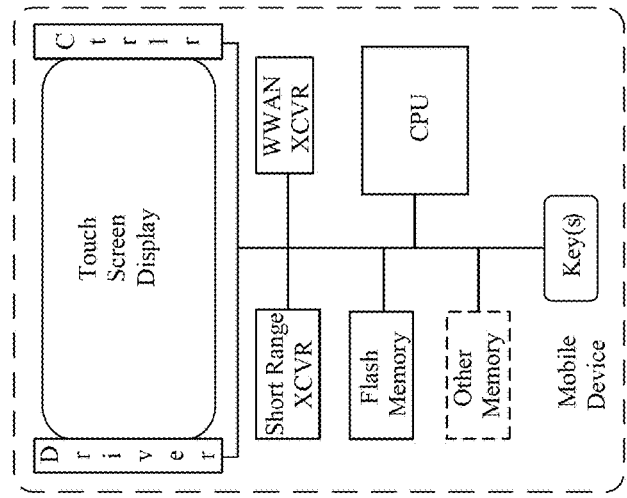
FIG. 6 is a simplified functional block diagram of a mobile device, as an alternate example of a user terminal device, for possible communication in or with the system of FIG. 2A.
Figure 5:
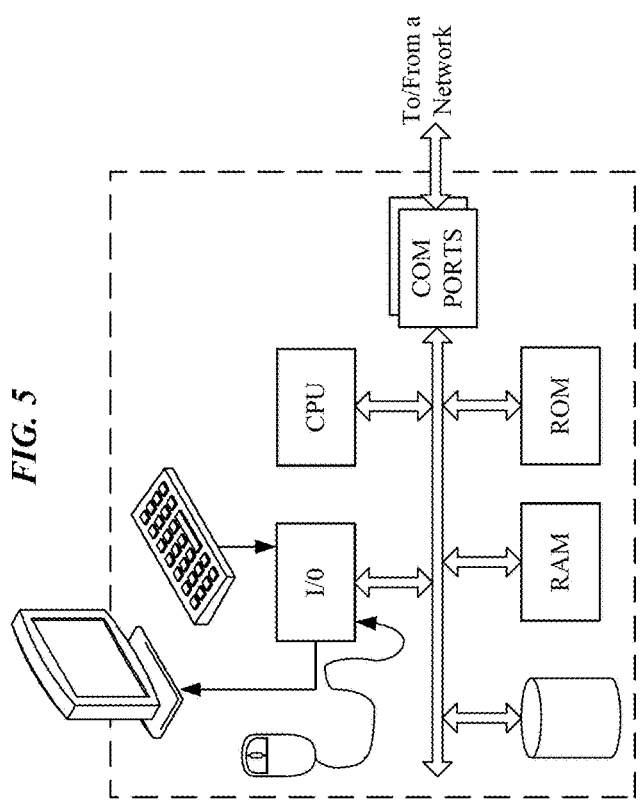
FIG. 5 is a simplified functional block diagram of a personal computer or other user terminal device, which may be used as the remote access terminal, in the system of FIG. 2A.
Figure 4:
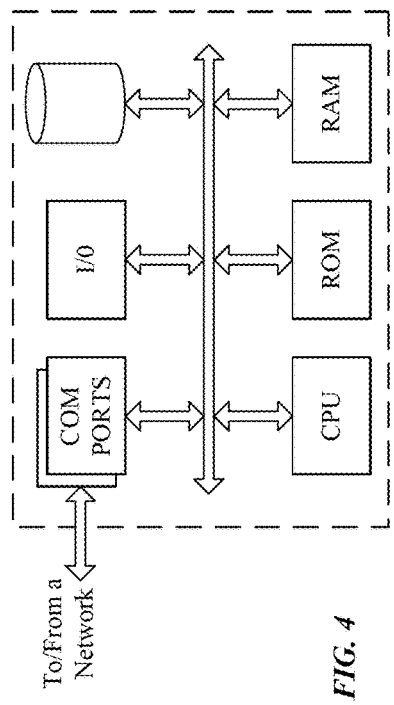
FIG. 4 is a is a simplified functional block diagram of a computer that may be configured as a host or server, for example, to function as the external server or a server if provided at the premises in the system of FIG. 2A.

As shown by the above discussion, although many intelligent processing functions of the system 10 are implemented in an intelligent lighting device 11, at least some functions of devices associated or in communication with the networked lighting system 10 as discussed relative to FIGS. 1-3 may be implemented with general purpose computers or other general purpose user terminal devices, although special purpose devices may be used. FIGS. 4-6 provide functional block diagram illustrations of examples of general purpose hardware platforms.

FIG. 4 illustrates a network or host computer platform, as may typically be used to implement a host or server, such the computer 63 or server 71. FIG. 5 depicts a computer with user interface elements, as may be used to implement a personal computer or other type of work station or terminal device, such as one of the terminal 65 in FIGS. 2A and 2B, although the computer of FIG. 5 may also act as a server if appropriately programmed. The block diagram of a hardware platform of FIG. 6 represents an example of a mobile device, such as a tablet computer, smartphone or the like with a network interface to a wireless link, which may alternatively serve as a user terminal device like 65. It is believed that those skilled in the art are familiar with the structure, programming and general operation of such computer equipment and as a result the drawings should be self-explanatory.

A server (see e.g. FIG. 4), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs (see FIG. 5). A mobile device (see FIG. 6) type user terminal may include similar elements, but will typically use smaller components that also require less power, to facilitate implementation in a portable form factor. The example of FIG. 6 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer hardware platform of FIG. 4 and the terminal computer platform of FIG. 5 are shown by way of example as using a RAM type main memory and a hard disk drive for mass storage of data and programming, whereas the mobile device of FIG. 6 includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 5). The mobile device example in FIG. 6 uses a touchscreen type display, where the display is controlled by a display driver, and user touching of the screen is detected by a touch sense controller (Ctrlr). The hardware elements, operating systems and programming languages of such computer and/or mobile user terminal devices also are conventional in nature, and it is presumed that those skilled in the art are adequately familiar therewith.

Although FIGS. 4-6 in their present form show computers and user terminal devices, generally similar configurations also may be used within other elements of the lighting system 10. For example, one implementation of the brain, communication and interface elements of a lighting device 11 may utilize an architecture similar to that of one of the computers or mobile terminals. As a more specific example, the personal computer type hardware in FIG. 5 (except for the keyboard, mouse and display) could serve as the brain and communication elements of a lighting device, where the input/output interface I/O would interface to an appropriate light driver and to any sensor(s) or other enhanced input or output device(s) included within the lighting device. As another example of use of an architecture similar to those of FIGS. 4-6 that may be utilized in a system like that of FIG. 2A or 2B, a lighting controller or other user interface device (UI) might utilize an arrangement similar to the mobile device of FIG. 6, albeit possibly with one or two transceivers compatible with the networking technology for the data networks 17A, 17B of the particular premises 12 (e.g. to reduce costs).

As also outlined above, aspects of isolating portions of data within lighting device 11 may involve some programming, e.g. programming of the appropriate isolated elements 13A, 13B and/or computers, terminals or the like in communication therewith. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a management server or host computer of the lighting system service provider into any of the lighting devices, sensors, user interface devices, etc. of or coupled to the system 10 at the premises 12, including both programming for individual element functions and programming to provide or otherwise enforce isolation within a lighting device 11. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting system, comprising:
a sensor system configured to output at least one signal responsive to at least one sensed condition to a processing system; and
a lighting device including the processing system and programming for the processing system, wherein:
the processing system includes a first processor and a second processor; and
the programming configures the processing system to:
receive the at least one signal from the sensor system;
process, via the first processor, the at least one signal to produce a first portion of data;
process, via the second processor, the at least one signal to produce a second portion of data;
isolate the first portion of data such that the first portion of data is not accessible to the second processor; and
isolate the second portion of data such that the second portion of data is not accessible to the first processor.

2. The lighting system of claim 1, wherein:
the lighting device further includes a communication interface system having:
a first communication interface configured to enable communication to a first data network; and
a second communication interface configured to enable communication to a second data network isolated from the first data network; and
the programming further configures the processing system to:
deliver, via the first communication interface and to the first data network, the first portion of data; and
deliver, via the second communication interface and to the second data network, the second portion of data.

3. The lighting system of claim 2, wherein:
the lighting device is a luminaire; and
the first communication interface and the second communication interface are disconnected both directly and indirectly from each other.

4. The lighting system of claim 2, wherein the first data network and the second data network include Ethernet, optical fiber, cellular, WiFi, Bluetooth, or ZigBee.

5. The lighting system of claim 2, wherein:
the first communication interface is configured to enable communication to the first data network via a first physical link; and
the second communication interface is configured to enable communication to the second data network via a second physical link separate from the first physical link.

6. The lighting system of claim 2, wherein:
the first communication interface is configured to enable communication to the first data network via a first logical link across a physical media; and
the second communication interface is configured to enable communication to the second data network via a second logical link across the physical media logically isolated from the first logical link.

7. The lighting system of claim 1, wherein the first and second processors are virtualized processors within the processing system.

8. The lighting system of claim 1, wherein the first and second processors are physical processors within the processing system.

9. The lighting system of claim 1, wherein the lighting device further comprises:
a first power source configured to provide power to the first processor; and
a second power source, separate from the first power source, configured to provide power to the second processor.

10. The lighting system of claim 1, wherein:
the at least one signal includes a first signal responsive to a first sensed condition and a second signal responsive to the first sensed condition or a second sensed condition;
the sensor system comprises:
  a first sensor configured to sense the first sensed condition; and
  a second sensor configured to sense the first sensed condition or the second sensed condition;
the sensor system is further configured to:
  deliver the first signal responsive to the first sensed condition sensed by the first sensor to the processing system; and
  deliver the second signal responsive to the first sensed condition or the second sensed condition sensed by the second sensor to the processing system; and
the first processor is further configured to:
  receive the first signal from the sensor system; and
  process the first signal to produce the first portion of data; and
the second processor is further configured to:
  receive the second signal from the sensor system; and
  process the second signal to produce the second portion of data.

11. The lighting system of claim 1, wherein:
the at least one signal includes a first signal and a second signal responsive to the at least one sensed condition;
the sensor system includes:
  a first sensor configured to sense the at least one sensed condition; and
  a second sensor configured to sense the at least one sensed condition;
the sensor system is further configured to:
  output the first signal responsive to the at least one sensed condition sensed by the first sensor to the first processor; and
  output the second signal responsive to the at least one sensed condition sensed by the second sensor to the second processor.

12. The lighting system of claim 11, wherein:
the first processor is further configured to:
  receive the first signal from the sensor system; and
  process the first signal to produce the first portion of data; and
the second processor is further configured to:
  receive the second signal from the sensor system; and
  process the second signal to produce the second portion of data.

13. A method, comprising steps of:
isolating, within a processing system of a lighting device in a lighting system, a first portion of data related to at least one signal generated by a sensor system of the lighting system, the at least one signal generated responsive to at least one condition sensed by the sensor system;
isolating, within the processing system of the lighting device, a second portion of data related to the at least one signal generated by the sensor system;
delivering, via a first communication interface of a communication interface system within the lighting device, the first portion of data to a first data network; and
delivering, via a second communication interface of the communication interface system, the second portion of data to a second data network isolated from the first data network.

14. The method of claim 13, wherein:
the at least one signal includes a first signal responsive to a first sensed condition and a second signal responsive to the first sensed condition or a second sensed condition;
the step of isolating the first portion of data further comprises:
  receiving, at a first processor of the processing system, the first signal;
  processing, by the first processor, the first signal to produce the first portion of data; and
  forwarding, by the first processor, the first portion of data to the first communication interface but not to the second communication interface; and
the step of isolating the second portion of data further comprises:
  receiving, at a second processor of the processing system, the second signal;
  processing, by the second processor, the second signal to produce the second portion of data; and
  forwarding, by the second processor, the second portion of data to the second communication interface but not to the first communication interface.

15. The method of claim 13, wherein:
the lighting device is for illumination of a space intended for use of occupancy or observation; and
the first communication interface, the second communication interface, and the processing system are integrated in the lighting device.

16. The method of claim 13, wherein:

the step of delivering the first portion of data to the first data network comprises the first communication interface utilizing a first physical link to the first data network; and the step of delivering the second portion of data to the second data network comprises the second communication interface utilizing a second physical link to the second data network separate from the first physical link.

17. The method of claim 13, wherein:

the step of delivering the first portion of data to the first data network comprises the first communication interface utilizing a first logical link across a physical media; and the step of delivering the second portion of data to the second data network comprises the second communication interface utilizing a second logical link across the physical media logically isolated from the first logical link.

18. A method, comprising steps of:

isolating, within a processing system of a luminaire, a first portion of data related to at least one signal responsive to at least one sensed condition received by the processing system from a sensor system such that the first portion of data is not accessible to a second processor of the processing system; and isolating, within the processing system of the luminaire, a second portion of data related to the at least one signal responsive to the at least one sensed condition received by the processing system from the sensor system such that the second portion of data is not accessible to the first processor of the processing system.

19. The method of claim 18, further comprising:

receiving, at the processing system from the sensor system, the at least one signal responsive to the at least one sensed condition.

20. The method of claim 18, further comprising:

processing, via the first processor, the at least one signal to produce the first portion of data; and processing, via the second processor, the at least one signal to produce the second portion of data.

* * * * *